United States Patent [19]

Sugeno et al.

[11] Patent Number: 5,292,601
[45] Date of Patent: Mar. 8, 1994

[54] NONAQUEOUS ELECTROLYTE SECONDARY BATTERY

[75] Inventors: Naoyuki Sugeno; Masanori Anzai; Toru Nagaura, all of Fukushima, Japan

[73] Assignee: Sony Corporation, Tokyo, Japan

[21] Appl. No.: 792,628

[22] Filed: Nov. 15, 1991

[30] Foreign Application Priority Data

Nov. 17, 1990 [JP] Japan .................................. 2-312481
Mar. 7, 1991 [JP] Japan .................................. 3-067998

[51] Int. Cl.$^5$ .......................................... H01M 10/40
[52] U.S. Cl. ..................................... 429/197; 429/232
[58] Field of Search ....................... 429/194, 197, 232

[56] References Cited

U.S. PATENT DOCUMENTS

| | | | |
|---|---|---|---|
| 4,751,160 | 6/1988 | Plighta et al. | 429/197 |
| 4,786,499 | 11/1988 | Slane et al. | 429/197 |
| 5,093,216 | 3/1992 | Azuma et al. | 252/502 X |

FOREIGN PATENT DOCUMENTS

| | | |
|---|---|---|
| 0357001 | 3/1990 | European Pat. Off. . |
| 2641130 | 6/1990 | France . |
| WO90/13924 | 11/1990 | PCT Int'l Appl. . |

OTHER PUBLICATIONS

Koshina, "Organic Electrolyte Secondary Battery", *Patent Abstracts of Japan*, vol. 14, No. 154 (E-907) (4097) Mar. 23, 1990 of Appl. No. 63-163467.

Hiromi et al, "Nonaqueous Electrolyte Secondary Battery", *Patent Abstracts of Japan*, vol. 14, No. 151 (E-090) Mar. 22, 1990.

Okuno, "Nonaqueous Electrolyte Secondary Cell", *Patent Abstracts of Japan*, vol. 13, No. 401 (E-816)(3749) Sep. 6, 1989 of Appl. No. 62-302337.

*Primary Examiner*—Stephen Kalafut
*Attorney, Agent, or Firm*—Hill, Steadman & Simpson

[57] ABSTRACT

A nonaqueous electrolyte secondary batter which comprises a negative electrode which comprises a carbonaceous material capable of doping and de-doping lithium, a positive electrode made of an active material which comprises a Li-containing metal complex oxide of the general formula, $Li_xMO_2$, wherein M represents at least one member selected from the group consisting of Co, Ni and Mn and $0.5 \leq x \leq 1$, and a nonaqueous electrolyte which contains an electrolyte and an organic solvent therefor. The organic solvent is a mixed solvent of propylene carbonate and at least one member selected from the group consisting of diethyl carbonate and dipropyl carbonate.

1 Claim, 7 Drawing Sheets

NONAQUEOUS ELECTROLYTE SECONDARY BATTERY

BACKGROUND OF THE INVENTION

1. Field Of The Invention

This invention relates to secondary batteries and more particularly, to nonaqueous electrolyte secondary batteries which have a positive electrode containing a Li-containing metal complex oxide and a negative electrode made of a carbonaceous material.

2. Description Of The Prior Art

As is known in the art, various and novel types of portable electronic apparatus such as, for example, camera-assembled VTR, portable telephone sets, lap top-type microcomputers and the like, have been developed and put on the market one after another. There is now a great tendency toward compact and lightweight articles. Under these circumstances, batteries which are a portable mobile power source are required to be ones which have a higher energy density.

Main known secondary batteries are of the aqueous types which include, for example, lead batteries, nickel-cadmium batteries and the like. Although these batteries have good cycle characteristics, they are not satisfactory with respect to the energy density. In addition, the known batteries involve problems from the standpoint of ecology. Accordingly, there is a demand of developing novel types of secondary batteries in place of these conventional batteries.

Now, great attention has been directed to lithium nonaqueous electrolyte secondary batteries or so-called lithium rechargeable electrochemical cells which are free of any ecological problem and have a high energy density for high working potential.

In nonaqueous electrolyte batteries, the energy density of the battery depends on the characteristics of the positive electrode. Accordingly, there have been investigated and proposed a great number of active materials for the positive electrode.

In contrast, with secondary batteries, whether the development is successive or not depends on how a negative electrode composed of a lithium metal having good cycle characteristics can be developed. From this point of view, there remains little possibility of developing such a negative electrode of lithium.

For instance, a lithium secondary battery which is of the SUM-3 type and makes use of metallic lithium as the negative electrode has been reported with good characteristics. However, several troublesome problems involved in the lithium negative electrode have not been solved yet.

More particularly, With the case of nonaqueous electrolyte secondary batteries wherein lithium metal or alloys are employed as the negative electrode, when they are subjected to repetition of charge and discharge cycles, the metallic lithium is liable to electrodeposit as a powder, which is converted into dendrite-shaped crystals during the course of the charge cycle. As a consequence, they pass through fine holes of a separator film or interstices among fibers of a non-woven fabric separator to the positive electrode, whereupon internal short-circuiting takes place. Thus, a satisfactory charge and discharge cycle life is not ensured. In addition, since the metallic lithium is very active, there is a problem on safety.

To solve the problem, so-called Li-CIC (carbon-lithium intercalation compound) electrodes have been developed as a substitution for the lithium negative electrode and are considered to be promising with respect to the cycle life. More particularly, the Li-carbon intercalation compounds wherein lithium ions are intercalated in a kind of carbonaceous material are able to undergo reversible oxidation-reduction reaction in organic electrolytes containing lithium salts while accompanying electrochemical de-doping and doping of the lithium ions. The oxidation-reduction potential is in the range of about 0.02 to 1.0 volt, so that if combined with an appropriate material for positive electrode, such compounds will be usable as a material which is excellent as a negative electrode for non-aqueous electrolyte secondary batteries. In the discharge cycle of a battery system using the carbon-lithium intercalation compound as the negative electrode, the lithium ions doped in the carbon of the negative electrode are moved toward the positive electrode in which they play a role of escorting the electrons which are passed from the negative electrode through an outer circuit. On the other hand, in the charge cycle, the lithium ions which have been moved to the positive electrode are returned to the negative electrode wherein they play a role of escorting the electrons which are returned through the outer circuit. This means that in any stage of the charge and discharge cycles, any metallic lithium does not exist in the inside of the battery, thus not causing electrode-position of inactive lithium or growth of dentrite as will occur in prior art counterparts. In addition, since active materials for the positive and negative electrodes are unlikely to suffer breakage of the crystal structure, very good charge and discharge cycle characteristics are ensured.

In the nonaqueous electrolyte secondary batteries, the characteristic properties of organic electrolytes used in the battery are very important for obtaining good charge and discharge characteristics. Many studies have been made on the relationship between the characteristics of organic electrolyte and the charge and discharge characteristics. With regard to the nonaqueous electrolyte second batteries using lithium as the negative electrode, the following knowledges are obtained.

1. The conductivity of organic electrolyte is remarkably improved using combinations of solvents with a high dielectric constant and solvents with a low viscosity. This can be semi-quantitatively explained in terms of the dissociation and mobility of ions in the electrolyte.

2. The higher conductivity of an electrolyte results in a smaller degree of polarization of the lithium negative electrode, with the tendency that the charge and discharge efficiencies become high.

3. Mixed systems of propylene carbonate, sulforane or diethylsulfoxide as the solvent with a high dielectric constant and 1,2-dimethoxyethane as the low viscosity solvent can yield high conductivity and good charge and discharge properties.

In this connection, however, we found as a result of intensive studies that when an electrolyte using a mixed solvent, for example, of propylene carbonate and 1,2-dimethoxyethane is employed, relatively good charge and discharge cycles are obtained at normal temperatures but when the battery is repeatedly charged and discharged at high temperatures, for example, of 40° C., the capacity is abruptly lowered, so that the cycle life is inconveniently reduced to 1/10 of the life at normal temperatures.

As a matter of course, the secondary batteries to be used instead of existing Ni-Cd batteries and lead batteries have to be satisfactorily worked in a low to high temperature range of from at least −20° C. to at least 45° C. or over.

Accordingly, the abrupt lowering of the capacity under high temperature conditions in the nonaqueous electrolyte secondary battery using carbon-lithium intercalation compounds as the negative electrode greatly impedes the practical use of the battery.

OBJECTS AND SUMMARY OF THE INVENTION

It is an object of the invention to provide a nonaqueous electrolyte secondary battery which solves the problem involved in the prior art.

It is another object of the invention to provide a nonaqueous electrolyte secondary battery which has a high energy density and is substantially free of any ecological problem.

It is a further object of the invention to provide a nonaqueous electrolyte secondary battery which makes use of specific types of active materials for negative and positive electrodes whereby a good cycle life can be obtained under high temperature conditions.

According to the present invention, there is provided a nonaqueous electrolyte secondary battery which comprises a negative electrode which is composed of a carbonaceous material capable of doping and de-doping lithium, a positive electrode made of an active material which comprises a Li-containing metal complex oxide of the general formula, $Li_xMO_2$, wherein M represents at least one member selected from the group consisting of Co, Ni and Mn and $0.5 \leq x \leq 1$, and a nonaqueous electrolyte which contains an electrolyte and an organic solvent therefor, the organic solvent being a mixed solvent of propylene carbonate and at least one member selected from the group consisting of diethyl carbonate and dipropyl carbonate.

The nonaqueous electrolyte secondary battery of the invention which has such negative electrode and positive electrode as defined above and makes use of a mixed solvent of propylene carbonate and diethyl carbonate and/or dipropyl carbonate as a solvent for electrolyte, so that the battery has a high energy density, is free of any ecological problem and exhibits good charge and discharge cycles under high temperature conditions.

The secondary battery of the invention is able to supply a satisfactory energy over a prolonged cycle life to recently developed, small-sized portable apparatus without impeding compactness and lightweight properties. Since the nonaqueous electrolyte secondary battery has good charge and discharge cycle characteristics at high temperatures, they have utility in wide fields of secondary batteries in place of known lead or nickel-cadmium batteries.

DESCRIPTION OF THE PREFERRED EMBODIMENTS

Figure 1:
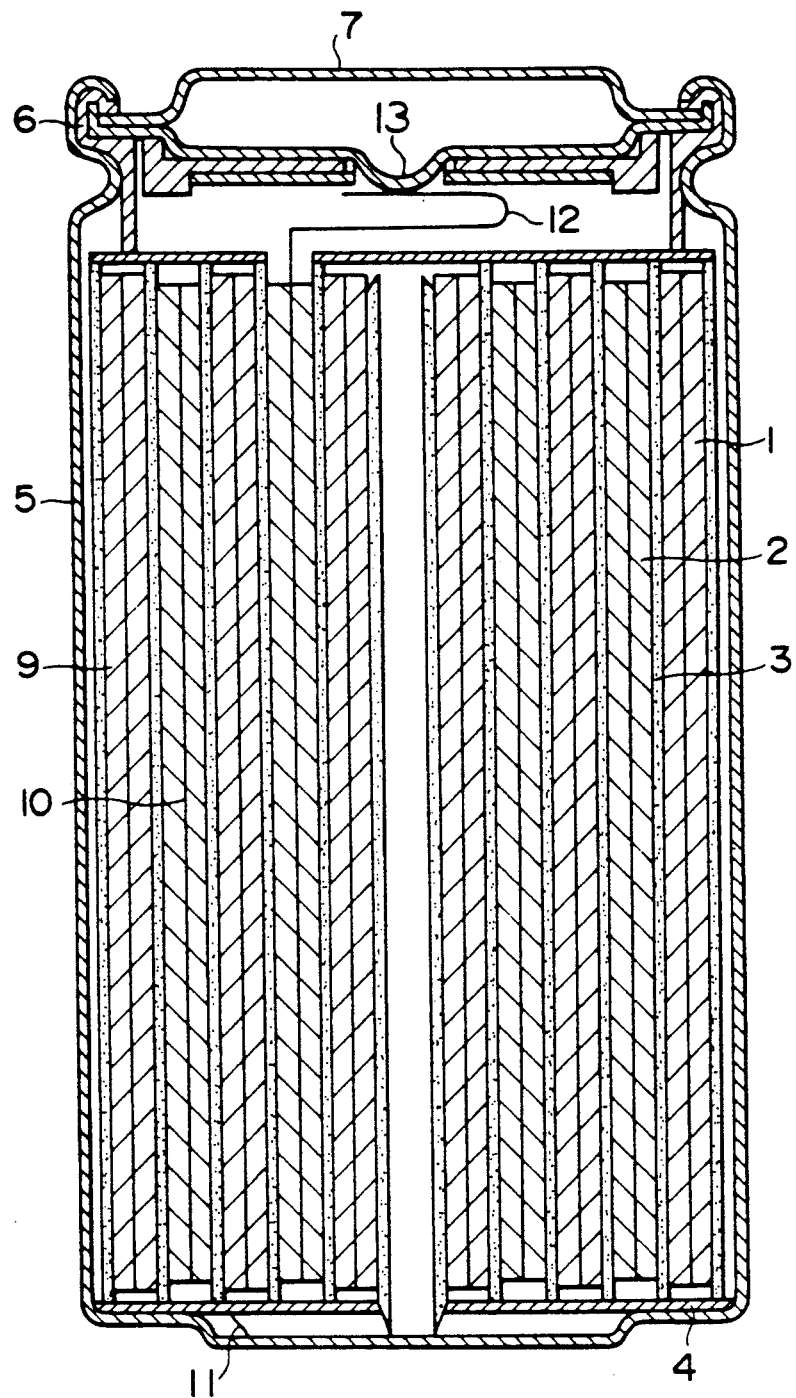
FIG. 1 is a sectional view of a cylindrically shaped nonaqueous electrolyte secondary battery to which the present invention is applicable.

In order to improve the cycle life of nonaqueous electrolyte secondary batteries under high temperature conditions, we made extensive studies and, as a result, found that the mixed solvent of propylene carbonate and dimethoxyethane which has been accepted as the most excellent solvent for use in conventional secondary batteries using a lithium negative electrode is not always the most suitable for use in nonaqueous electrolyte secondary batteries using carbon-lithium intercalation compounds as a negative electrode. For such nonaqueous electrolyte secondary batteries using the carbon-lithium intercalation compound as the negative electrode, use of diethyl carbonate and/or dipropyl carbonate as the low viscosity solvent is most suitable. By this, the cycle characteristic under high temperature conditions can be remarkably improved.

As defined before, the secondary battery of the invention is of the type which includes a negative electrode mainly composed of a carbonaceous material capable of doping and de-doping lithium, a positive electrode which comprises as an active material for the positive electrode a lithium-containing metal complex oxide of the general formula, $Li_xMO_2$, wherein M represents at least one member selected from the group consisting of Co, Ni and Mn and $0.5 \leq x \leq 1$, and a nonaqueous electrolyte which contains an electrolyte and an organic solvent therefor, characterized in that the organic solvent consists essentially of a mixed solvent of propylene carbonate and at least one member selected from the group consisting of diethyl carbonate and dipropyl carbonate.

When a battery is assembled using $Li_xMO_2$, wherein M and x have, respectively, the same meanings as defined above, such as $LiCoO_2$, as the positive electrode and a carbonaceous material as the negative electrode and is charged, there is obtained a secondary battery wherein the carbon-lithium intercalation compound serves as a negative electrode according to the reaction of the following formula (1). The charge and discharge reactions of the secondary battery are shown in the following formula (2).

$$LiCoO_2 \xrightarrow{\text{Charging}} Li_{1-x}CoO_2 + Li_xC \qquad (1)$$

-continued

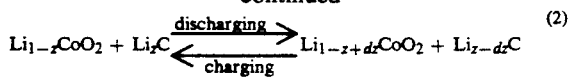
(2)

The average discharge voltage of the secondary battery is very high at about 3.6 volts, for which there can be realized a secondary battery of the SUM-3 size which has an energy density not less than 180 Wh/l. The charging is possible within a relatively quick time of one hour.

Any shortage of the cycle life by light load discharging is not observed, unlike lithium rechargeable electrochemical cells using metallic lithium as the negative electrode. Further, a long cycle life has been confirmed, e.g. when the battery is employed at normal temperatures to a discharge rate or depth of 100%, it can stand repeated use over about 1200 cycles.

However, if a mixed solvent of propylene carbonate and 1,2-dimethoxyethane is used as the solvent for the electrolyte, a sharp lowering of the capacity takes place when the charge and discharge cycles are repeated at a high temperature of 40° C. In addition, the life of 1200 cycles at normal temperatures is reduced to about 1/10.

The cycle life at high temperatures can be improved using a mixed solvent of propylene carbonate and diethyl carbonate and/or dipropyl carbonate. The content by volume percent of propylene carbonate is preferably in the range of from 75 to 15% by volume of the mixed solvent. More preferably, the content of the propylene carbonate based on the mixed solvent is in the range of from 60 to 20% by volume, within which good charge and discharge cycle characteristics under low temperature conditions can be obtained.

The most preferred electrolyte used in the present invention is $LiPF_6$. Aside, $LiAsF_6$, $LiClO_4$ and the like may be used.

The active material for the positive electrode is a lithium-containing metal complex oxide of the formula, $Li_xMO_2$, wherein x and M have, respectively, the same meanings as defined before. Examples of the metal complex oxide include $LiCO_2$, $LiNi_yCo_{1-y}O_2$ wherein $0<y<1$, $LiNiO_2$, $LiMn_2O_4$ and mixtures thereof. The active material is ordinarily used in combination with a conductive agent such as graphite and a binder therefor such as polyvinylidene fluoride.

The carbonaceous material for the negative electrode may be ones which are ordinarily used in this type of secondary battery. Specific and preferred examples of the carbonaceous material are as follows.

First, the carbonaceous materials are those which are obtained by carbonizing organic materials by firing or the like technique.

Starting organic materials are preferably furan resins such as homopolymers and copolymers of furfuryl alcohol or furfural. Specific examples include polymers of furfural and phenol, furfuryl alcohol and dimethylol urea, furfuryl alcohol, furfuryl alcohol and formaldehyde, furfuryl and ketones, and the like. The carbonaceous materials obtained by carbonizing the furan resins have a spacing ($d_{002}$) of the (002) planes of not less than 2.70 angstroms and has not any exothermic peak at temperatures of not lower than 700° C. when determined by the differential thermal analysis (DTA) in a stream of air. Thus, such materials have very good characteristics for use as a negative electrode material of the battery.

Moreover, there are also preferably used carbonaceous materials which are obtained from petroleum pitches having a H/C atomic ratio of 0.6 to 0.8. More particularly, such a petroleum pitch is introduced with oxygen-containing functional groups for so-called oxygen crosslinkage to provide a precursor having an oxygen content of from 0 to 20 wt %, followed by firing to obtain a carbonaceous material. This type of carbonaceous material is described, for example, in Japanese Patent Publication No. 53-31116. In this connection, however, by the optimization of the content of oxygen, there is obtained a carbonaceous material which has a spacing ($d_{002}$) of (002) planes of not less than 3.70 and an exothermic peak of not lower than 700° C. when determined by the differential thermal analysis (DTA). This carbonaceous material is used as a negative electrode material.

Further, during the course of the carbonization of the furan resins or petroleum pitches, phosphorus compounds or boron compounds may be added, thereby providing carbonaceous materials having a greater capability of being doped with lithium. Examples of the phosphorus compound include phosphorus oxides such as phosphorus trioxide, phosphorus tetraoxide, phosphorus pentaoxide and the like, and oxoacids of phosphorus such as orthophosphoric acid (so-called phosphoric acid), metaphosphoric acid, polyphosphoric acid and the like. In view of the ease in handling, phosphoric acid is preferred.

The amount of the phosphorus compound to be added for the carbonization of the organic material should preferably be in the range of from 0.2 to 15 wt %, calculated as phosphorus, based on the organic or carbonaceous material. The content of phosphorus in the carbonaceous material should preferably be in the range of from 0.2 to 5.0 wt %.

The boron compounds include, for example, boron oxides such as diboron dioxide, diboron trioxide (so-called boron oxide), tetraboron trioxide, tetraboron pentaoxide and the like, and oxoacids and, salts thereof, such as orthoboric acid (so-called boric acid), metaboric acid, tetraboric acid and the like. These boron compounds can all be added to the reaction system for carbonization in the form of an aqueous solution.

The amount of the boron compound to be added for the carbonization of the organic material should preferably be in the range of from 0.15 to 2.5 wt %, calculated as boron, based on the organic or carbonaceous material and the content of boron in the carbonaceous material should preferably in the range of from 0.1 to 2.0 wt %.

The carbonaceous material is usually used in combination with a binder such as polyvinylidene fluoride as will be described in examples.

The present invention is more particularly described by way of examples.

EXAMPLE 1

In this example, there was fabricated a nonaqueous electrolyte secondary battery which made use of a carbonaceous material as a negative electrode material, a mixture of $LiCoO_2$ and $LiNi_{0.6}Co_{0.4}O_2$ as a positive electrode material, and a mixed solvent of propylene carbonate (PC) and diethyl carbonate as an organic solvent for electrolyte.

For the fabrication of the negative electrode, petroleum pitch was provided as a starting material, into which oxygen-containing functional groups were introduced through so-called oxygen crosslinkage in an amount of 10 to 20%, followed by firing in a stream of an inert gas at 1000° C. to obtain a carbonaceous material. The carbonaceous material was subjected to X-ray diffraction analysis, with the result that a spacing of (002) planes was found to be 3.76 angstroms and a true specific density was 1.58.

The carbonaceous material was broken into pieces to obtain a carbonaceous powder with an average size of 10 μm. 90 parts by weight of the carbonaceous powder was mixed with 10 parts by weight of polyvinylidene fluoride to obtain a mixture for negative electrode. This mixture was dispersed in N-methyl-2-pyrrolidone to obtain a slurry.

The slurry for negative electrode was uniformly applied on opposite sides of a 10 μm thick band-shaped copper foil serving as a current collector for negative electrode and dried, followed by compression molding with a roll press to obtain a band-shaped negative electrode.

On the other hand, for the fabrication of a positive electrode, lithium carbonate and cobalt carbonate were mixed at a ratio by mole of 0.5:1 and fired in air at 900° C. for 5 hours to obtain $LiCoO_2$. Further, lithium carbonate, nickel carbonate and cobalt carbonate were mixed at ratios by mole of 0.5:0.6:0.4 and fired in air at 900° C. for 5 hours to obtain $LiNi_{0.6}Co_{0.4}O_2$.

54.6 parts by weight of $LiCoO_2$ and 30.4 parts by weight of $LiNi_{0.6}Co_{0.4}O_2$ were mixed with 6 parts by weight graphite used as a conductive agent and 3 parts by weight of a polyvinylidene fluoride used as a binder to obtain a mixture for positive electrode. This mixture was dispersed in N-methyl-2-pyrrolidone to obtain a slurry for positive electrode.

The slurry was uniformly applied on opposite sides of a 20 μm thick band-shaped aluminum foil serving as a current collector for positive electrode, dried and compression molded with a roll press to obtain a band-shaped positive electrode.

Thereafter, a convolutely wound electrode element as shown in FIG. 1 was made using the band-shaped negative electrode and the band-shaped positive electrode. More particularly, a band-shaped negative electrode 1, a band-shaped positive electrode 2 and a fine porous polypropylene film separator 3 were each cut to have a length and a width sufficient for accommodation in a battery can 5 with an outer diameter of 20 mm and a height of 51 mm when assembled into a convolutely wound electrode element.

The thus assembled convolutely wound electrode was encased in a nickel-plated iron battery can 5 while placing an insulating sheet 4 at upper and lower sides of the electrode as shown. Although not illustrated in FIG. 1, an aluminium lead 12 for the positive electrode was connected to a current collector 10 for the positive electrode and a nickel lead 11 for the negative electrode was connected to the current collector 9 for the negative electrode. The leads 11, 12 and current collectors 9, 10 are connected in a conventional manner. These leads were each welded to the battery can 5.

An electrolyte was prepared by dissolving 1 mole/liter of $LiPF_6$ in a mixed solvent of 50 vol % of propylene carbonate and 50 vol % of diethyl carbonate. The electrolyte was poured into the battery can 5 and the can 5 was caulked through an insulating sealing gasket 6 applied with asphalt to fix a cover 7. A contact member 13 is provided between the aluminum lead 12 and the cover 7. Thus, a cylindrical nonaqueous electrolyte secondary battery having a diameter of 20 mm and a height of 50 mm (Battery-A) was fabricated.

EXAMPLE 2

The general procedure of Example 1 was repeated except that dipropylene carbonate was used instead of diethyl carbonate, thereby obtaining a cylindrical nonaqueous electrolyte secondary battery (Battery-B).

COMPARATIVE EXAMPLE 1

In this comparative example, a mixed solvent of propylene carbonate and 1,2-dimethoxyethane was used instead of the mixed solvent of propylene carbonate and diethyl carbonate used in Example 1. More particularly, the general procedure of Example 1 was repeated except that $LiPF_6$ was dissolved in a mixed solvent of propylene carbonate and 1,2-diethoxyethane, thereby obtaining a cylindrical nonaqueous electrolyte secondary battery (Comparative Battery-C).

EXAMPLE 3

This example illustrates a nonaqueous electrolyte secondary battery using $LiCoO_2$ alone as a positive electrode material.

The general procedure of Example 1 was repeated except that 91 parts by weight of $LiCo_2$ was mixed with 3 parts by weight of polyvinylidene fluoride and 6 parts by weight of graphite to obtain a mixture for positive electrode, thereby fabricating a cylindrical nonaqueous electrolyte secondary battery (Battery-D).

EXAMPLE 4

This example illustrates a nonaqueous electrolyte secondary battery using $LiCoO_2$ alone as a positive electrode material and a mixed solvent of propylene carbonate and dipropyl carbnate as an organic solvent for the electrolyte.

The general procedure of Example 2 was repeated except that 91 parts by weight of $LiCoO_2$ was mixed with 3 parts by weight of polyvinylidene fluoride and 6 parts by weight of graphite to obtaining a mixture for positive electrode, thereby fabricating a cylindrical nonaqueous electrolyte secondary battery (Battery-E).

The thus fabricated Batteries-A, B, D and E and Comparative Battery-C were each subjected to repetition of a charge and discharge cycle at a temperature of 45° C. to determine a discharged milliampere-hour value in each cycle. The results are shown in FIGS. 2 and 3.

It will be noted that the charging was carried out for 3 hours at a constant current of 1 ampere in such a way that the charge potential was set at a maximum level of 4.1 volts. The discharging was effected at a constant resistance of 6.2 ohms and continued to a final voltage of 2.75 volts.

Figure 2:
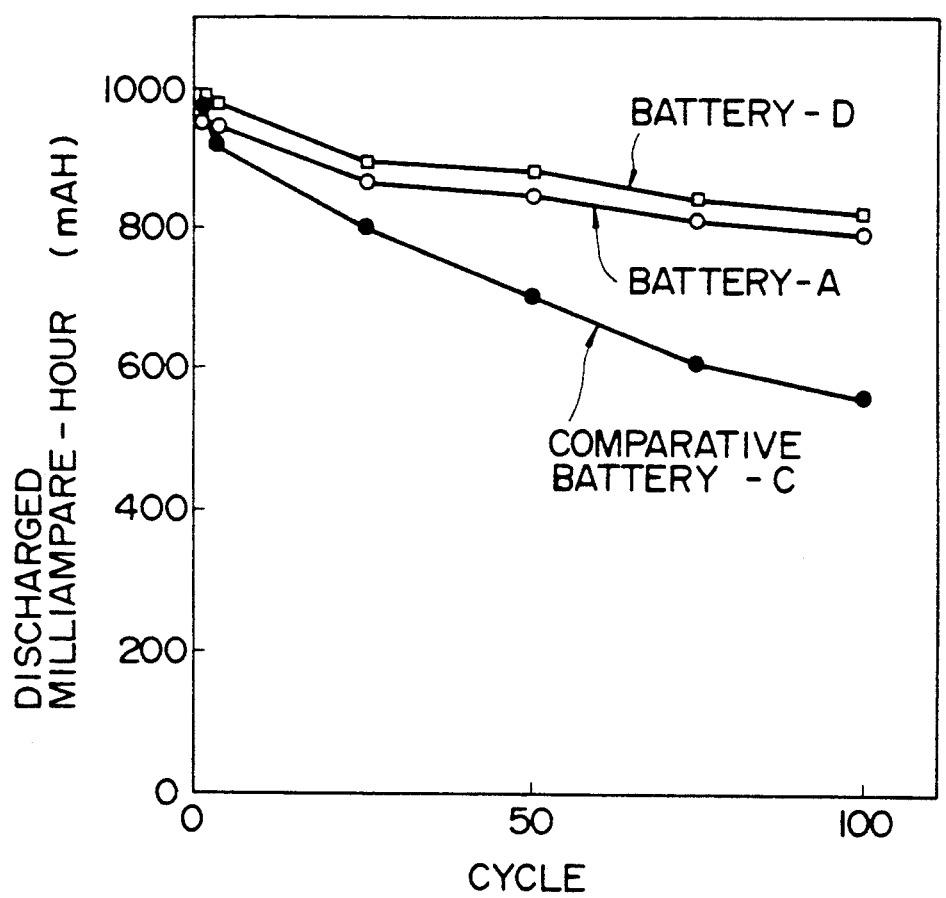
FIG. 2 is a graphical representation of the discharged milliampere-hour in relation to the variation in charge and discharge cycles at 45° C. for batteries A and D of the invention and battery C for comparison.
Figure 3:
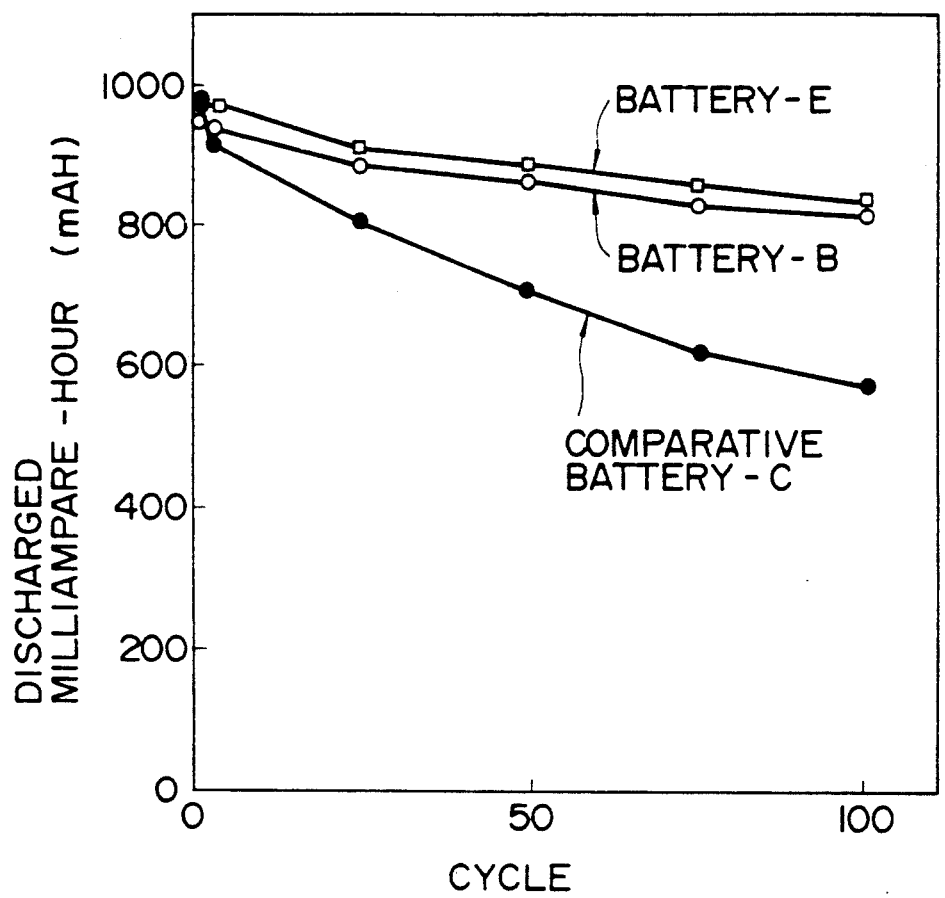
FIG. 3 is a graphical representation of the discharged milliampere-hour in relation to the variation in charge and discharge cycles at 45° C. for batteries B and E of the invention and battery C for comparison.

As will be apparent from FIGS. 2 and 3, with Comparative Battery-C using the mixed solvent of propylene carbonate and 1,2-diethoxyethane, the discharge milliampere-hour value is greatly lowered as the charge and discharge cycle is repeated. At the 100th cycle, the initial value of 980 mAh is lowered to 560 mAh (57%). In contrast, with Battery-A of the invention, the initial value of 950 mAh is lowered only to 800 mAh (84%) at the 100th cycle. Likewise, with the Battery-B, the initial value of 950 mAh at the 100th cycle is lowered only to 810 mAh (85%). With the Battery-D of the invention, the initial value of 980 mAh is lowered only to 830 mAh at the 100th cycle. With the Battery-E of the invention, the initial value of 970 mAh is lowered only to 825 mAh (85%) at the 100th cycle.

Although the Comparative Battery-C using the mixed solvent of propylene carbonate and dimethoxyethane brings about a very great lowering of the capacity at 45° C., the batteries A, B, D and E of the invention using mixed solvents of propylene carbonate and diethyl carbonate or dipropyl carbonate are only small in the lowering at 45° C. when compared with the cases at normal temperatures. Thus, the batteries of the invention are significantly improved over the prior art battery.

Moreover, when the batteries were subjected to a similar charge and discharge cycle test at normal temperatures, the degrees in the lowering of the discharged milliampere-hour of Comparative Battery-C and Batteries A and B were similar to each other. At the 100th cycle, the ratio to the initial value of each battery was about 90%.

EXAMPLE 5

This example illustrates fabrication of a nonaqueous electrolyte secondary battery wherein pitch coke is used as a negative electrode material, $LiMn_2O_4$ is used as a positive electrode material, and a mixed solvent of propylene carbonate and diethyl carbonate is used as an organic solvent for electrolyte.

For the fabrication of the negative electrode, pitch coke was broken into pieces with an average size of 40 μm and fired in a stream of an inert gas at 1000° C. to obtain a carbonaceous powder.

90 parts by weight of the carbonaceous powder and 10 parts by weight of polyvinylidene fluoride as a binder were mixed to obtain a mixture for negative electrode. The mixture was dispersed in n-methyl-2-pyrrolidone to obtain a slurry.

The slurry was uniformly applied onto opposite sides of a 10 μm thick band-shaped copper foil serving as a current collector for negative electrode, dried and compression molded with a roll press to obtain a band-shaped negative electrode.

On the other hand, for the fabrication of a positive electrode, manganese dioxide thermally treated at 400° C. and lithium carbonate were mixed at a ratio by mole of 1:0.25 and fired in air at 850° C. for 5 hours to obtain $LiMn_2O_4$ ($Li_{0.5}MnO_2$).

86 parts by weight of $LiMn_2O_4$ was mixed with 10 parts by weight graphite used as a conductive agent and 4 parts by weight of a polyvinylidene fluoride used as a binder to obtain a mixture for positive electrode. This mixture was dispersed in N-methyl-2-pyrrolidone to obtain a slurry for positive electrode.

The slurry was uniformly applied on opposite sides of a 30 μm thick band-shaped aluminium foil serving as a current collector for positive electrode, dried and compression molded with a roll press to obtain a band-shaped positive electrode.

Thereafter, the band-shaped negative electrode, the band-shaped positive electrode and a 25 μm thick, fine porous polypropylene film separator were each cut to have a size sufficient for accommodation in a battery can when assembled into a convolutely wound electrode element. The thus assembled convolutely wound electrode was encased in a nickel-plated iron battery can while placing an insulating sheet at upper and lower sides of the electrode. An aluminium lead for the positive electrode was lead out from a current collector for the positive electrode and a nickel lead for the negative electrode was lead out from the current collector for the negative electrode. These leads were each welded to the battery can.

An electrolyte was prepared by dissolving 1 mole/liter of $LiPF_6$ in a mixed solvent of 25 vol % of propylene carbonate and 75 vol % of diethyl carbonate. The electrolyte was poured into the battery can and the can was caulked through an insulating sealing gasket applied with asphalt to fix a cover. Thus, a cylindrical nonaqueous electrolyte secondary batter having a diameter of 14 mm and a height of 50 mm (Battery-F) was fabricated.

EXAMPLE 6

The general procedure of Example 5 was repeated except that dipropyl carbonate was used instead of diethyl carbonate, thereby obtaining a cylindrical nonaqueous electrolyte secondary battery (Battery-G).

COMPARATIVE EXAMPLE 2

In this comparative example, a mixed solvent of propylene carbonate and 1,2-dimethoxyethane was used instead of the mixed solvent of propylene carbonate and diethyl carbonate used in Example 5. More particularly, the general procedure of Example 5 was repeated except that $LiPF_6$ was dissolved in a mixed solvent of 50 vol % of propylene carbonate and 50 vol % of 1,2-diethoxyethane, thereby obtaining a cylindrical nonaqueous electrolyte secondary battery (Comparative Battery-H).

The thus fabricated Batteries-F and G and Comparative Battery-G were each subjected to repetition of the charge and discharge cycle at a temperature of 45° C. to determine a discharged milliampere-hour value in each cycle. The results are shown in FIGS. 4 and 5.

It will be noted that the charging was carried out for 3 hours at a constant current of 400 milliamperes in such a way that the charge potential was set at a maximum level of 4.2 volts. The discharging was effected at a constant current of 200 mA and continued to a final voltage of 2.75 volts.

Figure 4:
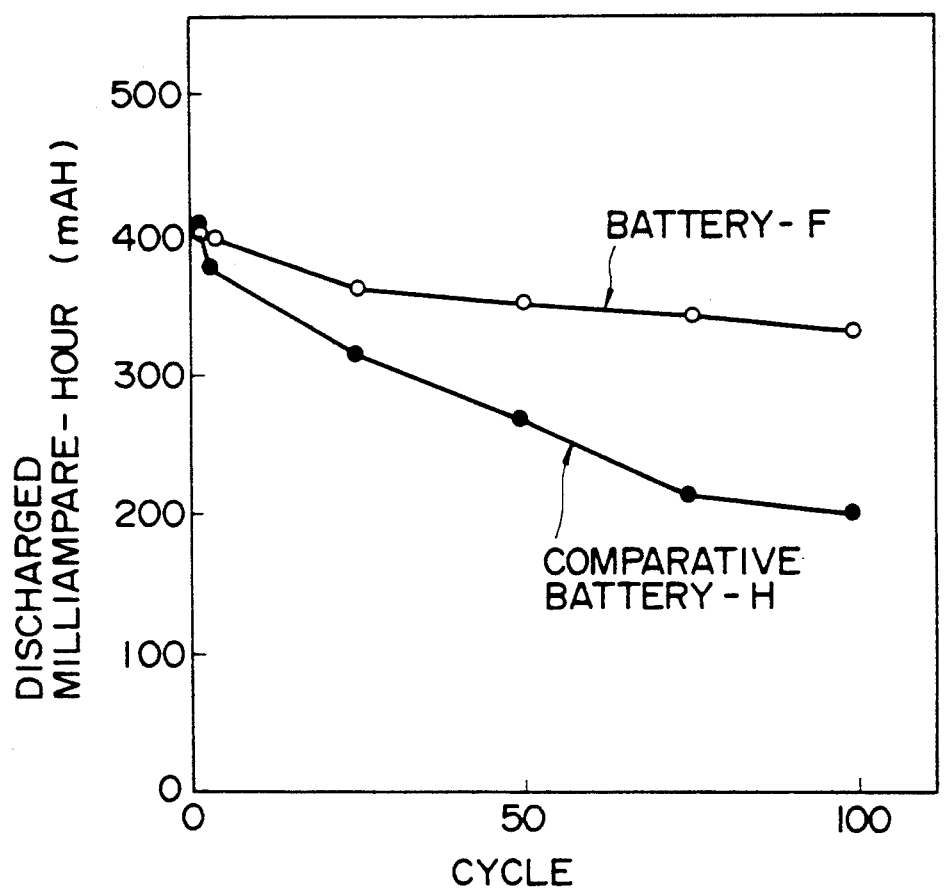
FIG. 4 is a graphical representation of the discharged milliampere-hour in relation to the variation in charge and discharge cycles at 45° C. for battery F of the invention and battery H for comparison.
Figure 5:
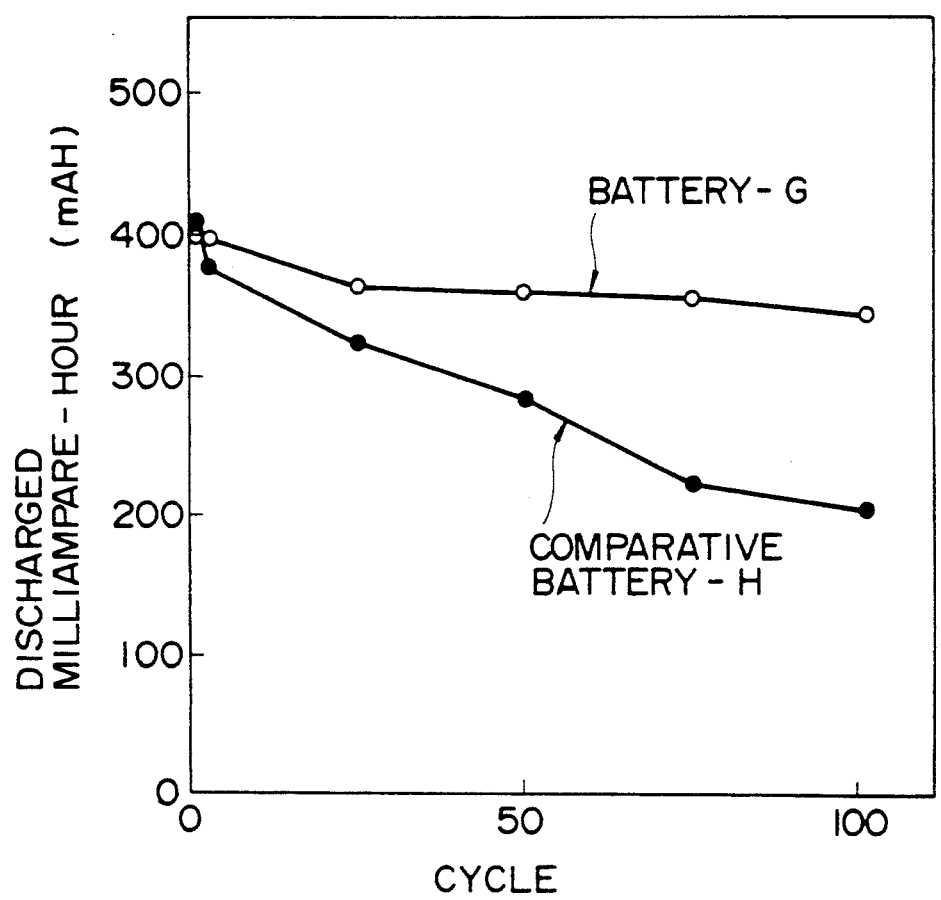
FIG. 5 is a graphical representation of the discharged milliampere-hour in relation to the variation in charge and discharge cycles at 45° C. for battery G of the invention and battery H for comparison.

As will be apparent from FIGS. 4 and 5, with Comparative Battery-H using the mixed solvent of propylene carbonate and 1,2-diethoxyethane, the discharge milliampere-hour value is greatly lowered as the charge and discharge cycle is repeated. At the 100th cycle, the initial value of 405 mAh is lowered to 200 mAh (49%). In contrast, with Batteries F and G of the invention using the mixed solvent of propylene carbonate and diethyl carbonate or dipropyl carbonate, the values at the 100th cycle are, respectively, 82% and 85% of the initial values, thus the lowering of the discharge milliampere-hour being only small.

Moreover, when these batteries were subjected to the charge and discharge cycle test at normal temperatures, it was found that the discharge milliampere-hour values of the comparative battery and the batteries of the invention were each about 88% of the initial value.

Thus, it will be seen that in the case of the nonaqueous electrolyte secondary batteries using pitch coke as the negative electrode and $LiMn_2O_4$ as the positive electrode material, the use of the mixed solvent of propylene carbonate and diethyl carbonate or dipropyl carbonate ensures good charge and discharge cycle characteristic.

COMPARATIVE EXAMPLE 3

This comparative example illustrates use of metallic lithium as the negative electrode material, $LiCoO_2$ as the positive electrode material, and a mixed solvent of propylene carbonate and diethyl carbonate as the organic solvent for electrolyte.

The secondary battery which makes use of metallic lithium as the negative electrode material, $LiCoO_2$ as the positive electrode material and a mixed solvent of propylene carbonate and diethyl carbonate as the organic solvent is known in U.S. Pat. No. 4,751,160. Moreover, secondary batteries which make use of metallic lithium as the negative electrode material, compounds other than $LiCoO_2$ as the positive electrode material and a mixed solvent of propylene carbonate and dialkyl carbonates as the organic solvent are known in U.S. Pat. No. 4,786,499 and Japanese Laid-open Patent Application Nos. 2-10666 and 2-12777.

For the fabrication of the negative electrode, a 80 μm thick metallic lithium sheet was bonded to opposite sides of a 15 μm thick band-shaped copper foil used as a current collector for negative electrode, and compression molded with a roll press to obtain a band-shaped negative electrode.

For the fabrication of a positive electrode, 91 parts by weight $LiCoO_2$ as obtained in Example 1 was mixed with 6 parts by weight of graphite used as a conductive agent and 3 parts by weight of polyvinylidene fluoride to obtain a mixture for positive electrode. The mixture was dispersed in N-methyl-2-pyrrolidone to obtain a slurry.

The slurry was uniformly applied on opposite sides of a 20 μm thick band-shaped aluminium foil serving as a current collector for positive electrode, dried and compression molded with a roll press to obtain a band-shaped positive electrode.

Thereafter, the band-shaped metallic lithium negative electrode, the band-shaped positive electrode and a separator made of a fine porous polypropylene film were each cut to have a length and a width sufficient for accommodation in a battery can when assembled into a convolutely wound electrode element. The thus assembled convolutely wound electrode was encased in a nickel-plated iron battery can while placing an insulating sheet at upper and lower sides of the electrode. An aluminium lead for the positive electrode was lead out from a current collector for the positive electrode and a nickel lead for the negative electrode was lead out from the current collector for the negative electrode. These leads were each welded to the battery can.

An electrolyte which was prepared by dissolving 1 mole/liter of $LiPF_6$ in a mixed solvent of 50 vol % of propylene carbonate and 50 vol % of diethyl carbonate was poured into the battery can and the can was caulked through an insulating sealing gasket applied with asphalt to fix a cover. Thus, a cylindrical nonaqueous electrolyte secondary batter having a diameter of 20 mm and a height of 50 mm (Comparative Battery-I) was fabricated.

Comparative Example 4

The general procedure of Comparative Example 3 was repeated except that dipropyl carbonate was used instead of diethyl carbonate, a cylindrical nonaqueous electrolyte secondary battery (Comparative Battery-J).

The Batteries I and J were subjected to charging and discharging five times at normal temperatures, followed by repetition of the charge and discharge cycle at 45° C. The results of the discharged milliampere-hour measurement in each cycle at 45° C. are shown in FIGS. 6 and 7.

The charging was carried out at a current of 250 mA for 7 hours while setting a maximum charge voltage of 4.1 volts and the discharging was carried out at a resistance of 6 ohms to a final voltage of 2.75 volts.

Figure 6:
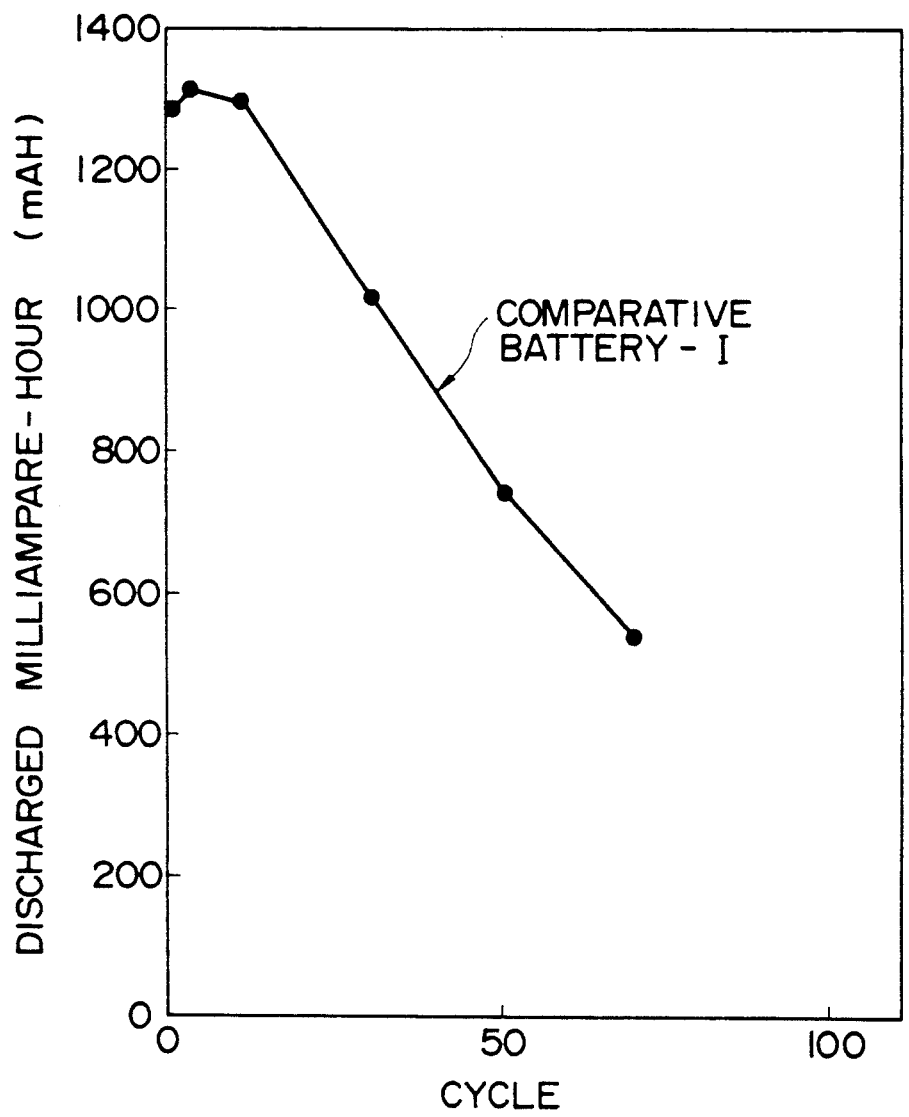
FIG. 6 is a graphical representation of the discharged milliampere-hour in relation to the variation in charge and discharge cycles at 45° C. for battery I for comparison.
Figure 7:
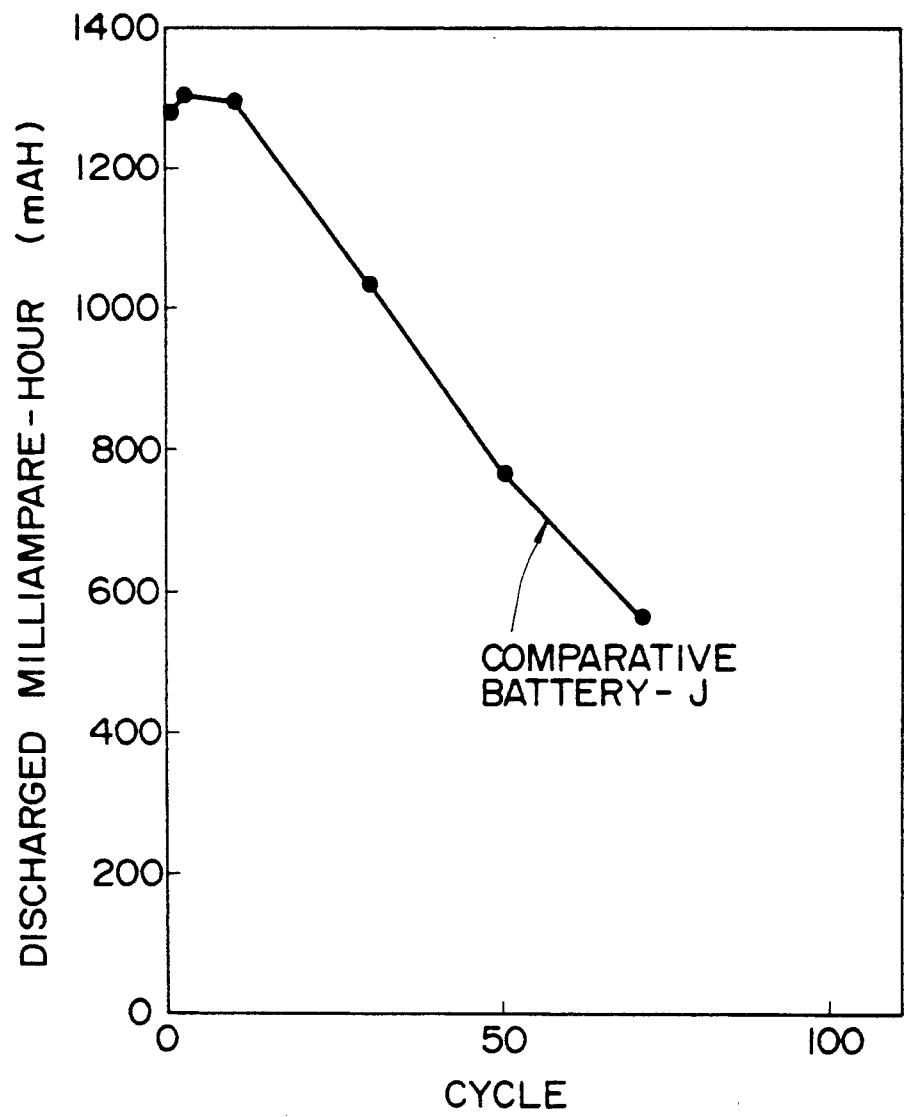
FIG. 7 is a graphical representation of the discharged milliampere-hour in relation to the variation in charge and discharge cycles at 45° C. for battery J for comparison.

From FIGS. 6 and 7, it will be seen that repetition of the charging and discharging operations results in a great lowering of the discharged milliampere-hour, i.e. the discharge capacities at the 50th cycle of the respective batteries are lowered to 56% and 58.5%.

From this, evidence is given that in the nonaqueous electrolyte secondary batteries using the lithium negative electrode, the charge and discharge characteristic is not satisfactorily improved when using a mixed solvent of propylene carbonate and diethyl carbonate or dipropyl carbonate as the organic solvent. Such a mixed solvent is effective in improving the charge and discharge cycle characteristic when used in nonaqueous electrolyte secondary batteries using the negative electrode made of carbonaceous materials.

What is claimed is:

1. A nonaqueous electrolyte secondary battery comprising:
 a negative electrode including a carbonaceous material capable of doping and de-doping lithium, the carbonaceous material selected from the group consisting of furan resins and petroleum pitches and having a spacing of (002) planes of not less than 3.70 angstroms and any exothermic peak at temperatures not lower than 700° C. when determined differential thermal analysis, the carbonaceous material further including at least one of 0.2 to 5.0 wt % of phosphorus and 0.1 to 2.0 wt % of boron, a positive electrode made of an active material which includes a Li-containing metal complex oxide of the general formula $Li_xMO_2$, wherein M represents at least one member selected from the group consisting of Co, Ni and Mn and $0.5 \leq X \leq 1$, and a nonaqueous electrolyte which contains an electrolyte and an organic solvent therefor, the organic solvent being a mixed solvent of propylene carbonate and at least one member selected from the group consisting of diethyl carbonate and dipropyl carbonate.

* * * * *